US011433262B1

(12) United States Patent
Wilke et al.

(10) Patent No.: US 11,433,262 B1
(45) Date of Patent: Sep. 6, 2022

(54) POSITIVE PRESSURE DOG RESPIRATOR

(71) Applicant: Combat Capabilities Development Command, Chemical Biological Center, APG, MD (US)

(72) Inventors: Douglas E Wilke, Joppa, MD (US); Daniel E Barker, Red Lion, PA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 289 days.

(21) Appl. No.: 16/666,591

(22) Filed: Oct. 29, 2019

Related U.S. Application Data

(60) Provisional application No. 62/754,194, filed on Nov. 1, 2018.

(51) Int. Cl.
| | |
|---|---|
| *A62B 18/06* | (2006.01) |
| *A01K 13/00* | (2006.01) |
| *A62B 9/04* | (2006.01) |
| *A62B 7/12* | (2006.01) |
| *A62B 7/10* | (2006.01) |
| *A62B 18/10* | (2006.01) |

(52) U.S. Cl.
CPC ............ *A62B 18/06* (2013.01); *A01K 13/006* (2013.01); *A62B 7/10* (2013.01); *A62B 7/12* (2013.01); *A62B 9/04* (2013.01); *A62B 18/10* (2013.01)

(58) Field of Classification Search
CPC .. A62B 18/06; A62B 7/12; A62B 9/04; A62B 18/10; A62B 23/025; A62B 18/084; A62B 7/08; A62B 7/10; A62B 18/006; A62B 18/02; A62B 18/08; A62B 18/025; A01K 13/006
See application file for complete search history.

(56) References Cited

U.S. PATENT DOCUMENTS

| | | | | | |
|---|---|---|---|---|---|
| 2,312,714 | A | * | 3/1943 | Herbin | A62B 18/06 128/206.15 |
| 2,843,119 | A | * | 7/1958 | Glasser | A61D 7/04 128/205.17 |
| 4,002,167 | A | * | 1/1977 | Rambosek | A61D 7/04 128/206.24 |

(Continued)

FOREIGN PATENT DOCUMENTS

| | | | | |
|---|---|---|---|---|
| DE | 102008054027 A1 | * | 5/2010 | ........... A62B 17/006 |
| DE | 102014215241 A1 | * | 2/2016 | ........... A62B 18/045 |
| KR | 20200001487 U | * | 7/2020 | ............. A52B 18/06 |

OTHER PUBLICATIONS

English translation for DE 102014215241, machine translated from espacenet.com, translated on Dec. 4, 2021.*

(Continued)

*Primary Examiner* — Tu A Vo
(74) *Attorney, Agent, or Firm* — Ulysses John Biffoni

(57) ABSTRACT

A dog respirator including a mask adapted to surround the dog's head and a positive pressure air supply and filter separate from the mask and adapted to be placed on the dog's body away from the dog's head. The air supply and filter may be attached to the dog's back using a harness. The respirator/mask surrounding the dog's head is connected to and receives positive-pressure filtered air from the filtered air supply so that the interior of the mask is maintained at positive pressure relative to atmospheric pressure with filtered air.

12 Claims, 2 Drawing Sheets

(56) References Cited

U.S. PATENT DOCUMENTS

| | | | | | |
|---|---|---|---|---|---|
| 4,590,951 | A | * | 5/1986 | O'Connor | A62B 18/006 128/204.23 |
| 4,955,372 | A | * | 9/1990 | Blackmer | A61D 7/04 128/203.16 |
| 5,249,570 | A | * | 10/1993 | Cox | A01K 25/00 128/203.25 |
| 5,785,008 | A | * | 7/1998 | Liu | A01K 25/00 119/831 |
| 6,752,146 | B1 | * | 6/2004 | Altshuler | A62B 18/006 2/209.12 |
| 7,077,126 | B2 | * | 7/2006 | Kummer | A61D 7/04 128/200.23 |
| 2002/0062830 | A1 | * | 5/2002 | Meier | A62B 18/006 128/206.12 |
| 2003/0019494 | A1 | * | 1/2003 | Bennett | A62B 18/006 128/204.14 |
| 2003/0024529 | A1 | * | 2/2003 | Beizndtsson | A62B 17/005 128/201.29 |
| 2003/0075174 | A1 | * | 4/2003 | Shahaf | A61M 16/06 128/201.25 |
| 2003/0111074 | A1 | * | 6/2003 | Alon | A62B 17/04 128/201.22 |
| 2006/0157057 | A1 | * | 7/2006 | Palmquist | A62B 7/12 128/201.22 |
| 2007/0095344 | A1 | * | 5/2007 | Abernethy | A62B 17/006 128/201.22 |
| 2008/0053447 | A1 | * | 3/2008 | Ratajczak | A62B 7/10 128/205.25 |
| 2009/0151055 | A1 | * | 6/2009 | Duncan | A62B 17/04 2/410 |

OTHER PUBLICATIONS

English translation for KR 20200001487, translated through Search engine by Clarivate analytics, translated on Jul. 16, 2022.*
English translation for DE 102008054027, translated through Search engine by Clarivate analytics, translated on Jul. 16, 2022.*

* cited by examiner

POSITIVE PRESSURE DOG RESPIRATOR

CROSS-REFERENCE TO RELATED APPLICATIONS

This application claims the benefit of priority of provisional patent application Ser. No. 62/754,194 filed on Nov. 1, 2018, which is commonly assigned.

GOVERNMENT INTEREST

The invention described herein may be manufactured, used, and/or licensed by or for the United States Government.

FIELD OF THE INVENTION

This invention is intended to provide handlers of working dogs the capability to protect the dog's head, eyes, and breathing tract from harmful or toxic airborne particulates, gases, and vapors at a high level.

BACKGROUND OF THE INVENTION

Dogs (canines) have long been used for law enforcement and military purposes. Typical roles for such animals include protection of personnel, search and rescue, pursuit of people of interest, tracking, smell detection of items of interest, e.g., drugs, explosives, other chemicals and toxins, intimidation and other civil and criminal applications. The roles of dogs in law enforcement and military activities have expanded over the years. Originally, a dog was simply equipped with a collar to which a leash could be attached for a handler to control and restrain the dog since the area of use was relatively small and local. Today, dogs are transported to and from and are used in large areas of investigation and in tactical theaters of operation including areas involving hostilities. Such areas of investigations may include tunnels, caves, and, in general, areas which may not provide easy egress and escape.

To prevent injury to the eyes, head, and breathing tract of working dogs in hazardous environments, masks have been developed to place over the head of the dog. The dog masks of WWI covered the dog's entire head and consisted of eight layers of chemically treated cheesecloth. The mask had two cellulose eye lenses to allow the dog to see, ear pockets for the ears, space for the jaws to work, and a wide neckband with straps to tie around the neck. The dogs were used for both searching for wounded and to carry messages.

During WWII several experimental dog protective masks were tested until it was found that two masks (the E12R8 and the E43R3) had the most potential. Both masks were made from coated canvas duck, which was quite rigid and could be stitched into a shape appropriate for the dog's muzzle. The E12R8 used a single filter cartridge that was fixed to the front of the muzzle piece. Several horizontal slits allowed for inhaled air to pass over the dog's snout. An exhale valve was positioned on the bottom-front of the mask for expired air and a hard, cellulose acetate eye shield was glued into place to offer a wide field of view. On the inside, two thick rubber collars were used to create a seal around the dog's head and snout. To hold the mask on the dog's head, two adjustable canvas straps were secured behind the animal's ears. The success of the E12R8 was limited to field tests. Unfortunately, the mask's filter placement caused the mask to get jarred and dislodged while on the dog's head (due to the animal's natural tendency to carry its head low to the ground). Also, having the filter on the front of the mask caused dirt and refuse to clog the inlet slits. The problems encountered during these trials ultimately found the E43R3 to be more successful and thus, this mask was standardized as the M6 mask.

The M6 Dog Gas Mask was fitted over the face and muzzle of the dog. The mask used a coated canvas duck muzzle-piece equipped with one large slightly bulged cellulose acetate eye lens. This mask had two air filter canisters that were positioned on either side of the mask under the eye lens instead of a single unit attached to the front. The outlet valve was located directly under the muzzle. This design proved more serviceable in the field because the dog's natural tendency to carry its head low to the ground did not interfere with the position of the filters. In addition, breathing resistance was probably reduced. However, it was found that clogging of the filter inlet holes was still a problem. Consequently, a metal disk was fitted over each filter's inlet hole to deflect mud and other refuse. Clogging was also a problem with the exhale valve.

The World War I and II era masks for canines were designed as negative pressure respirators. These concepts utilized the canine's inhalation to pull air though a filter, and therefore, the seal between the mask and the dog's fur was critical to prevent unfiltered air from entering the interior of the mask. It is difficult to understand the success these masks would have sealing to a dog's fur to provide a seal which could support a negative pressure respirator. Since the mask and filters were carried by the dog's head, and the head would be carried low and bent from the neck or otherwise moved vigorously or abruptly by the dog, such movements and the nature of the dog's fur would all negatively affect the integrity of the seal of the mask.

Additionally, there are commercial bags and cups to provide ventilation/oxygen for a dog. However, these devices do not have or need a complete seal to the dog for operation. Therefore, these devices would not prevent toxins and hazardous chemicals from reaching the dog's eyes or breathing tract which would be harmful or lethal to the dog.

It is also preferable if the canine respirator can be easily placed around the dog in an effective manner. For example, if the dog is used for rescue in a possibly toxic environment, or if the dog is used to detect toxins in a location which does not have easy egress and a toxin is detected, it would be necessary to place the respirator on the dog in short notice to protect the animal from harm. Previous masks which contained the filter cartridge on the mask placed on the dog's head would be cumbersome to place over the head of the dog. In addition and most importantly, if the seal of a negative pressure respirator to the dog is weak or broken, ambient air is simply drawn into the respirator through the failed seal rather than through filtration. Obviously, any toxins or hazardous chemicals in the ambient air drawn into the respirator without filtration would be harmful to the canine.

SUMMARY OF THE INVENTION

There are two unique subsystems which form the canine respirator of this invention. The first is a positive pressure filtered air supply system comprising a fan/impeller forcing air through a filter cartridge, so that the dog's inhalation is not used to draw outside air through the filters. The positive pressure filtered air supply is carried on the body of the dog and provides filtered air at greater than atmospheric pressure to the second subsystem, the respirator surrounding the dog's head. This second subsystem is a neck dam style respirator mask specifically designed to accommodate a dog and prevent unfiltered ambient air from entering the respirator. It does this by creating an effective seal around the dog's head and also by maintaining a pressure inside the respirator mask which is greater than atmospheric pressure so that any leakage flows out of the mask rather than into the mask as would be the case in an inhalation based negative pressure system.

DETAILED DESCRIPTION OF THE INVENTION

Figure 1:
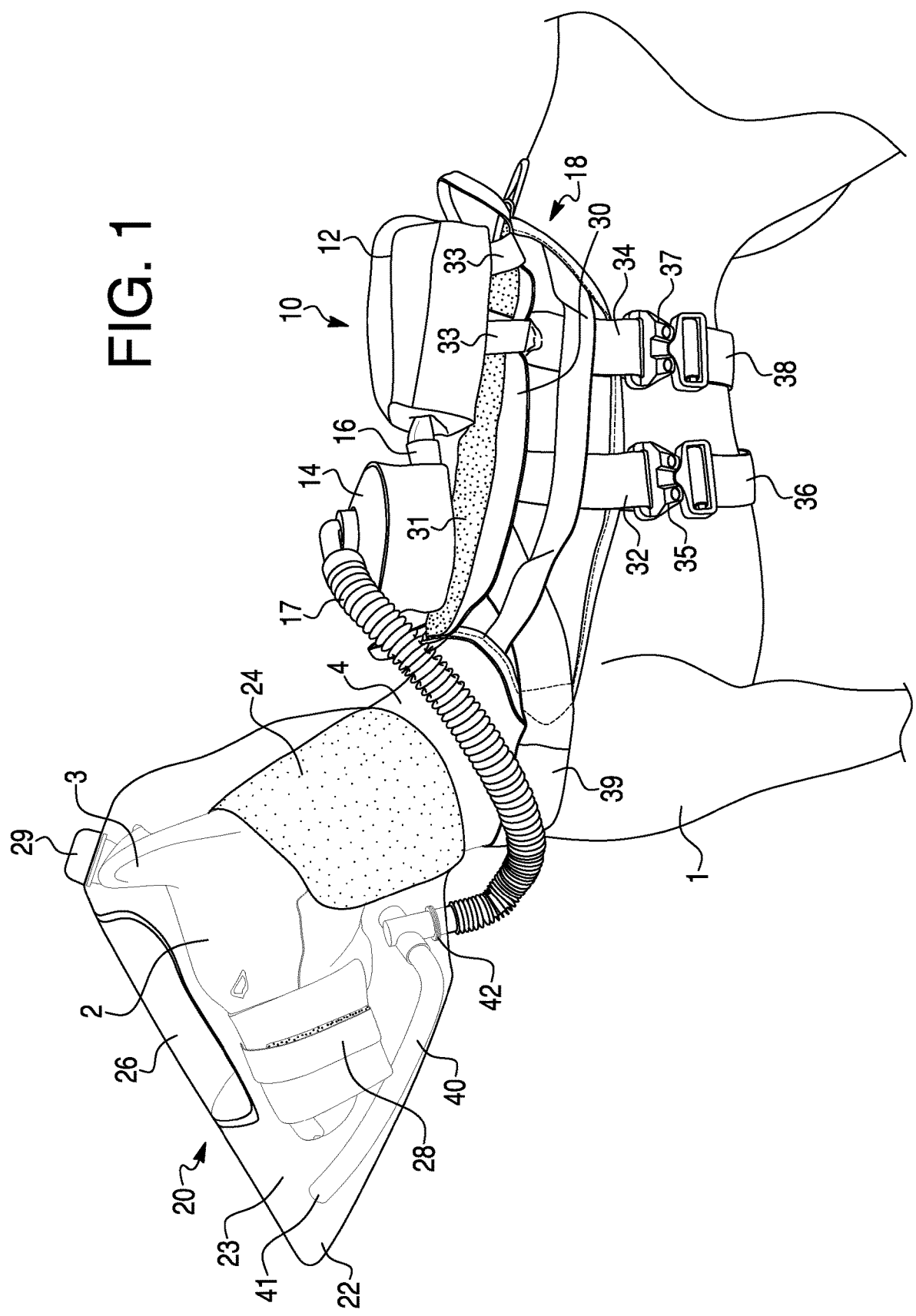
FIG. 1 is a perspective side view of the respirator of the invention placed on a dog.
Figure 2:
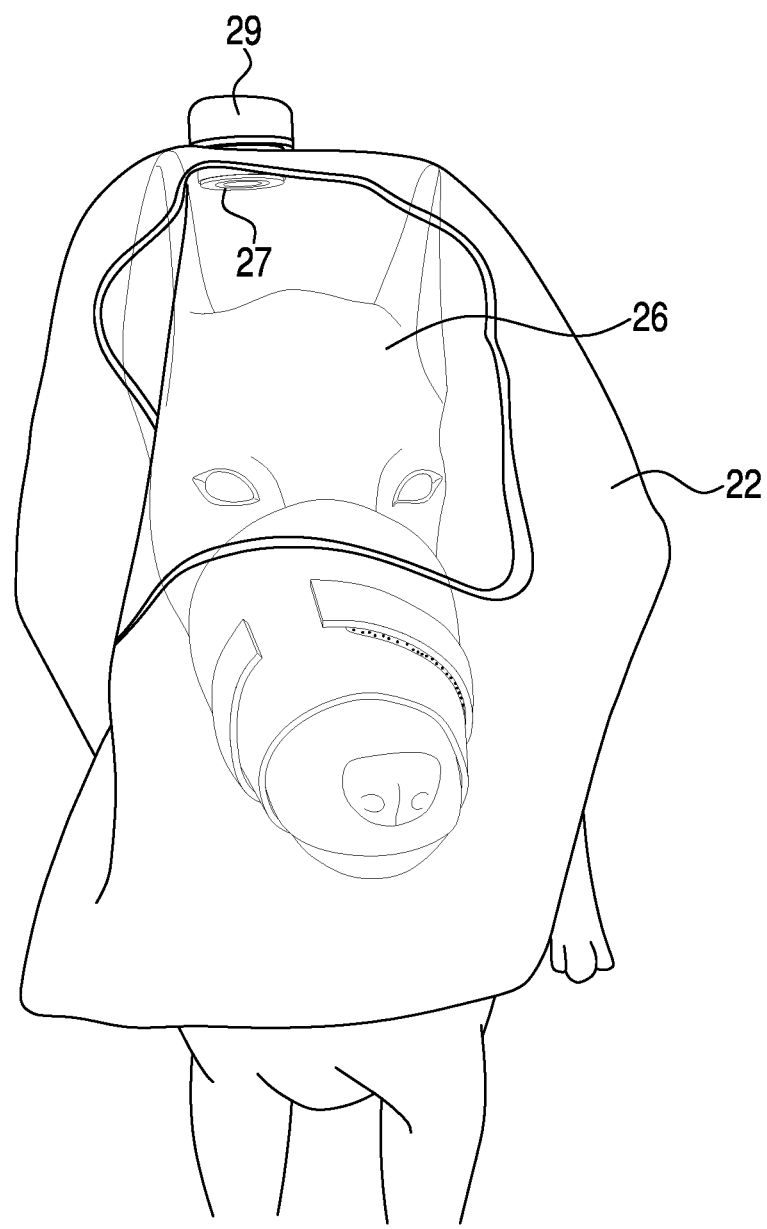
FIG. 2 is a perspective front view of the respirator of the invention placed on a dog.

The positive pressure dog respirator of this invention can be described by referring to FIGS. 1 and 2. In particular, a canine (dog) 1 is shown wearing the respirator assembly of this invention including a positive pressure filtered air supply subsystem 10 and a neck dam style respirator mask subsystem 20 designed to accommodate the head, neck and muzzle of the dog 1.

The positive pressure air supply subsystem 10 has five components including a positive pressure air supply 12; a filtration canister or canisters 14; a connecting hose 16 between positive pressure air supply 12 and filter 14; a harness 18 to hold the positive pressure air supply 12 and filter 14 onto the body of dog 1, and a hose or conduit 17 which connects the filter 14 to respirator subsystem 20.

The positive pressure air supply system 10 creates pressurized and filtered air which is used to pressurize the respirator 20. In this way the respirator 20 is maintained at a pressure greater than ambient atmospheric pressure and any leakage would flow out of the respirator and not into the respirator. The positive pressure air supply 12 can be any such supply that is known and is able to be portable, including an air supply in the form of a battery powered fan or impeller, or a pressurized bottle or tank and regulator. A fan or impeller driven by a digital motor can be programmed to provide the desired volumetric air flow, preferably in the 60-130 liters per minute range. Other known alternative methods to provide pressurized air can be used as long as such supply can be attached to a dog. As again shown in FIG. 1, the pressurized air generated from positive pressure air supply 12 flows through connecting hose 16 and into the filter 14. The filter 14 can provide particulate, chemical, and biological filtration and removes the harmful contaminants and toxins from the pressurized air stream received from the positive pressure air supply 12. Particulate, chemical, and biological filters are well known and, in particular, the specifics of such filters do not form a part of this invention. The positive air stream travels from filter 14, where the harmful contaminants are removed, and then through hose 17 to the respirator subsystem 20.

Positive pressure air supply 12 and filtration canister 14 are attached to harness 18. The attachment of positive air supply 12 and canister 14 to harness 18 can be by hook and loop fasteners such as shown by sheath 30 with hook and loop strip 31. Underneath air supply 12 and filter 14, although not shown, is a corresponding hook/loop strip which will attach to strip 31. Alternatively, or in addition to a hook and loop attachment, straps 33, or sewn connection to sheath 30 can be used to attach air supply 12 to harness 18. The harness 18 containing sheath 30 may be attached to dog 1 by a set of upper straps 32 and 34 which connect opposing sides of sheath 30 by buckles 35 and 37 to lower straps 36 and 38, respectively, around the underside of the body of dog 1. A separate strap 39, sewn to or otherwise secured to sheath 30, can be connected such as by hook and loop, snap, buckle, etc. around the front of the dog below the neck to further secure harness 18 to dog 1. The harness 18 allows the dog to carry the positive pressure air supply subsystem 10 on its back. Positioning of the positive pressure air supply subsystem 10 on the top center of the back of dog 1, although shown and preferred, is not required. For example, side by side orientation or moving features to the belly or chest of the dog could be acceptable so long as such features are secured. Of course, the positive pressure air supply 12 must be upstream of filter 14 such that only positive-pressure filtered air enters the respirator subsystem 20. Otherwise, so long as the air is filtered prior to entering the respirator, locations of the features of subsystem 10 on the harness 18 can vary from that shown.

Referring again to FIGS. 1 and 2, the respirator subsystem 20 forms a protective barrier around the dog's head 2. Thus, respirator subsystem 20 includes a chemically protective mask 22 which is shaped to match and cover the dog's head 2 and ears 3. The protective mask 22 must be impermeable to the atmosphere and should be formed of a material which is chemically resistant to toxic chemicals and particulates which may be in the ambient atmosphere. The mask 22 is preferably formed of a flexible film material. Such materials are well known and can include a polyolefin laminate. It is preferred that the mask 22 be transparent, although, it is not critical for the entire mask to be transparent. The mask 22 is closed off around the dog's neck 4 with a chemically protective rubber neck dam 24. The rubber neck dam 24 is chemically welded or adhesively attached to the interior to mask 22 such that when neck dam 24 is placed around dog's neck 4, a complete seal between the dog's neck 4 and the inside of mask 22 is provided such that no ambient air flows or leaks into the mask 22 between the interface of mask 22 and the dog's neck 4. The neck dam 24 is elastic so as to conform to and is stretched around the dog's neck 4. An additional collar (not shown) may be used to prevent the respirator from moving forward on the dog's head when pressurized.

If the entire mask 22 is not transparent, the chemically protective mask 22 must have a clear visor 26, chemically welded, glued, or otherwise attached and sealed thereto, that provides dog 1 with a means to see out of the respirator mask 22. In addition, a muzzle 28 can be added to the dog's snout to prevent the dog from biting the respirator and compromising the protective barrier.

The positive pressure filtered air stream from hose 17 enters mask 22 through an inner air supply tube 40 which is connected to hose 17 via air manifold 42. Air manifold 42 is sealed within mask 22 such that ambient air does not enter the interior of mask 22 between manifold 42 and mask 22. Again, attachment of air manifold 42 to mask 22 can be by chemical weld or an impermeable adhesive. Air manifold 42 and air supply tube 40 distribute filtered air to the breathing zone 23 of the dog within mask 22. The open end 41 of tube 40 is placed such that filtered air is directed to breathing zone 23 and in a path across the interior of visor 26. Although not shown, a visor air guide can be included in the interior of mask 22 to enhance air flow across visor 26. Pressurized filtered air traveling across the interior surface of visor 26 minimizes or prevents moist exhaled air from contacting and fogging the visor 26. Exhaled air is displaced from the nose and mouth of the dog 1 away from the breathing zone 23 of the dog by the placement of the end 41 of tube 40 within mask 22. Exhaled air exits respirator 20 from a valve 27 at the top of mask 22, see FIG. 2. The valve 27 may be protected from ambient conditions by a covering 29.

The positive pressure filtered air supply subsystem 10 and neck dam respirator subsystem 20 provide a number of advantages over previous negative-pressure dog masks and respirators. The incorporation of a positive pressure air supply to pressurize the respirator greatly increases the overall protection of the dog by minimizing the criticality of a complete and constant seal of the respirator to the dog. Thus, the positive pressure air supply into the mask 22 reduces, if not eliminates, ingress of any contaminants or poisonous atmosphere into the interior of mask 22 because any leak between the mask 22 and the dog's fur will only result in filtered air leaking out. Additionally, the positive pressure air supply and respirator design of this invention provides built-in anti-fogging measures for the visor to enhance the vision of the dog. The positive pressure air supply actively forces exhaled air away from the breathing zone 23 of the dog to limit possible $CO_2$ buildup. This positive air supply also minimizes heat buildup inside the respirator, in particular mask or hood 22.

The body mounted air supply subsystem 10, including positive air supply 12 and filtration cartridges 14, relieves the head borne weight to the dog found in previous systems in which the filtration cartridges weighed on the head of the dog, and not only could cause discomfort, but could compromise the seal of the mask and also compromise the filters because the lowered head of the dog could result in the filter component contacting the ground. The flexible mask 22 can be easily placed over the head of the dog at a moment's notice preventing harm or even death. The handler is not required to place a heavy and cumbersome respirator over the dog's snout as in previous systems. Thus, in operation, if the handler or the dog detect toxins in the ambient atmosphere, the handler can then place the components of the dog respirator on the animal. If the harness 18 is not already on the animal, the handler can place harness 18 around the dog such as by the buckle system shown in FIG. 1 and then the individual air supply 12 and filter 14 can be placed on sheath 30 such as by the hook and loop connection thereon. Thus, air supply 12 and filter 14 can simply be placed and pressed onto strip 31. If hoses 16 and 17 are not already attached to the respective air supply 12 and filter 14 such hoses can be attached by well-known methods such as, including, a snap fit or screw/thread connection. Finally, when required the respirator subsystem 20 including lightweight, plastic film mask 22 is placed over the head of the dog and held in place by rubber neck dam 24. Hose 17 is fit within manifold 42, again, by either a snap fit or screw/thread connection. Once all components are in place, the air supply system 12 is turned on and the handler can lead the dog into and out of any dangerous or hazardous situation caused by airborne substances. All components can be placed in a simple pack and readily removed by the handler when needed.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

The invention claimed is:

1. A dog respirator, comprising:
a positive pressure air supply;
a downstream air filter positioned downstream of and connected to said positive-pressure air supply;
a harness which is strapped onto the dog and is for supporting the positive pressure air supply and the air filter;
a mask adapted for placement over and surrounding the dog's head and adapted to allow the dog to see out of the mask;
a hose or conduit to direct filtered air from said filter into said mask so that an interior of said mask is maintained at a positive pressure relative to atmospheric pressure with filtered air, wherein said hose or conduit connects to a tube inside the mask that directs filtered air to an area within said mask near the dog's nose and across an interior surface of the mask to prevent fogging from decreasing the dog's visibility; and
an exhaust valve adapted to allow exhaled air to exit the interior of the mask; and
wherein said positive pressure air supply and air filter are configured to be attached to the dog's body and not the dog's head, wherein the positive pressure air supply and filter are removably attached to said harness by hook and loop fasteners, wherein each of the positive pressure air supply and the air filter comprise a first part of the hook and loop fasteners and a top surface of the harness is formed by a corresponding second part of the hook and loop fasteners configured to be removably attached to the first part.

2. The dog respirator of claim 1, wherein said mask comprises an impermeable and flexible plastic film.

3. The dog respirator of claim 1, wherein said mask is transparent.

4. The dog respirator of claim 1, wherein said mask is attached to the dog by an elastic band which surrounds the dog's neck.

5. The dog respirator of claim 4, wherein said elastic band is attached to the interior of said mask.

6. The dog respirator of claim 1, wherein said mask further includes a clear visor which allows the dog to see out of the mask.

7. The dog respirator of claim 6, wherein said tube inside the mask directs filtered air across the interior of the visor to prevent fogging from decreasing the dog's visibility.

8. The dog respirator of claim 1, wherein the positive-pressure air supply is connected to the filter by a hose or tube.

9. The dog respirator of claim 1, wherein a muzzle is placed around the dog's snout to prevent the dog from biting the mask.

10. The dog respirator of claim 1, wherein the positive-pressure air supply and the filter are placed on the dog's back.

11. The dog respirator of claim 1, wherein the exhaust valve has an exterior cover.

12. The dog respirator of claim 1, wherein the valve is positioned on the mask above the dog's head.

\* \* \* \* \*